UNITED STATES PATENT OFFICE.

JOSEPH JOHANN HEINRICH HUNTE, OF CHARLTON, ENGLAND, ASSIGNOR TO THE ACCUMULATOR INDUSTRIES, LIMITED, OF WOKING, ENGLAND.

PROCESS OF MAKING ELECTRIC ACCUMULATOR-PLATES.

SPECIFICATION forming part of Letters Patent No. 724,012, dated March 31, 1903.

Application filed April 15, 1902. Serial No. 103,047. (No specimens.)

*To all whom it may concern:*

Be it known that I, JOSEPH JOHANN HEINRICH HUNTE, a subject of the Emperor of Germany, residing at 3 Sundorne road, Charlton, in the county of Kent, England, have invented a new and useful Improved Process for the Manufacture of Electric Accumulator-Plates, of which the following is a specification.

This invention relates to the manufacture of positive-pole plates of the non-pasted type for electrical accumulators, and relates to a process whereby lead plates of any suitable form are treated so as to enable said plates to acquire substantially full electrical capacity after a single charge, no lengthy process of formation being necessary.

Hitherto it has been necessary to employ in the manufacture of plates of the non-pasted or Planté type a prolonged process of formation, or deleterious and corrosive substances have been used; but these, it is found, are detrimental to the efficiency of the accumulators containing plates so formed.

According to the present invention lead plates of any suitable form preferably having ribs or laminations are subjected to the action of chlorin and oxygen acting in combination, said gases preferably being electrolytically evolved from solutions of certain salts and oxidizing agents, hypochlorites usually being formed at the same time. As an example of a suitable electrolyte may be mentioned a solution of sulfate of soda in which are dissolved varying percentages of chlorids, such as sodium chlorid, chlorates, as potassium chlorate, and permanganates or sulfate of manganese, which will form a permanganate at the anode. I prefer, however, to employ an electrolyte consisting of a solution of sodium sulfate and sodium chlorid.

When the above-described action is performed electrolytically in solutions which show a feeble alkaline reaction, wherein the plate to be treated forms the anode, the duration of the treatment can be regulated to vary between ten to twelve hours and three to four days, the necessary duration of the treatment depending upon, *inter alia*, degrees of concentration, temperature, and current density.

The above treatment causes the formation of compounds of lead with oxygen and with chlorin, the latter being only in small quantities. The thickness of these layers can be varied at will by varying the duration or the intensity of the electrolytic treatment. After this preliminary treatment the plates having the above-mentioned layers formed on them are placed in vats containing certain electrolytic solutions and are connected as cathodes to a source of electricity of the necessary voltage. As suitable electrolytic solutions may be mentioned solutions of sodium sulfate or of potassium sulfate. I prefer, however, to employ a solution of sodium sulfate and sodium chlorid, the same solution as that employed in the preliminary treatment being preferably used. Acid electrolytes are preferably avoided. After this treatment the plates are found to consist of very porous layers of reduced lead mixed with some lower oxids of lead which are very firmly attached to the ribs, laminations, or other portions of the lead plate, the higher oxygen compounds having been reduced. The action also causes the combinations of lead with chlorin to be split up, the reduced lead resulting from this action helping to bind the layers of porous materials referred to above to the underlying plate. The plate is found to be entirely free from chlorids and chlorin. After the latter treatment of the plates as cathodes the plates are washed in running water, so as to remove the electrolytes adhering to them, and the plates are then connected as anodes in electric accumulator-cells containing dilute sulfuric acid. On the passage of the first charging-current the mass of firmly-adhering and highly-porous layers is converted into crystalline peroxid of lead, practically full capacity being acquired after the first charge.

The leaden core of the ribs, laminations, or main portion of the plate is protected by the superimposed layers of active material and is not corroded or seriously attacked when the plates are in constant use as accumulators.

What I claim is—

1. The process for manufacturing positive-pole plates for electric accumulators, consisting of the following treatments: the subjection of lead plates to the chemical action of oxygen and chlorin by passing a current through the lead plates arranged as anodes in an electrolyte consisting of a solution of a sulfate of one of the alkali metals in which is dissolved a chlorid of a metal and a substance or substances for causing the presence of a permanganate of a metal at the anodes, whereby chemical compounds of lead with oxygen and chlorin are produced; the breaking up by electrolytic means of the compounds containing lead and chlorin and the complete removal of the chlorin, and the reduction of the higher oxygen compounds to lead and the lower oxids of lead, whereby the original plates are converted into plates having a core of lead over which a porous mixture of reduced lead and lead oxid is laid; and the subsequent charging of these plates arranged as anodes in an electrolyte.

2. The process for manufacturing positive-pole plates for electric accumulators, consisting of the following treatments: the subjection of lead plates to the chemical action of oxygen and chlorin by passing a current through the lead plates arranged as anodes in an electrolyte consisting of a solution of a sulfate of one of the alkali metals in which is dissolved a chlorid of a metal and a permanganate of a metal, whereby chemical compounds of lead with oxygen and chlorin are produced; the breaking up by electrolytic means of the compounds containing lead and chlorin and the complete removal of the chlorin, and the reduction of the higher oxygen compounds to lead and the lower oxids of lead, whereby the original plates are converted into plates having a core of lead over which a porous mixture of reduced lead and lead oxid is laid; and the subsequent charging of these plates arranged as anodes in an electrolyte.

In testimony whereof I have signed my name to this specification in the presence of two subscribing witnesses.

JOSEPH JOHANN HEINRICH HUNTE.

Witnesses:
HERBERT SEFTON JONES,
LEONARD EDMUND HAYNES.